Sept. 19, 1967  J. M. GREEN ETAL  3,343,086
CAPACITIVE SIGNAL COMPARISON CIRCUIT
Filed March 20, 1963
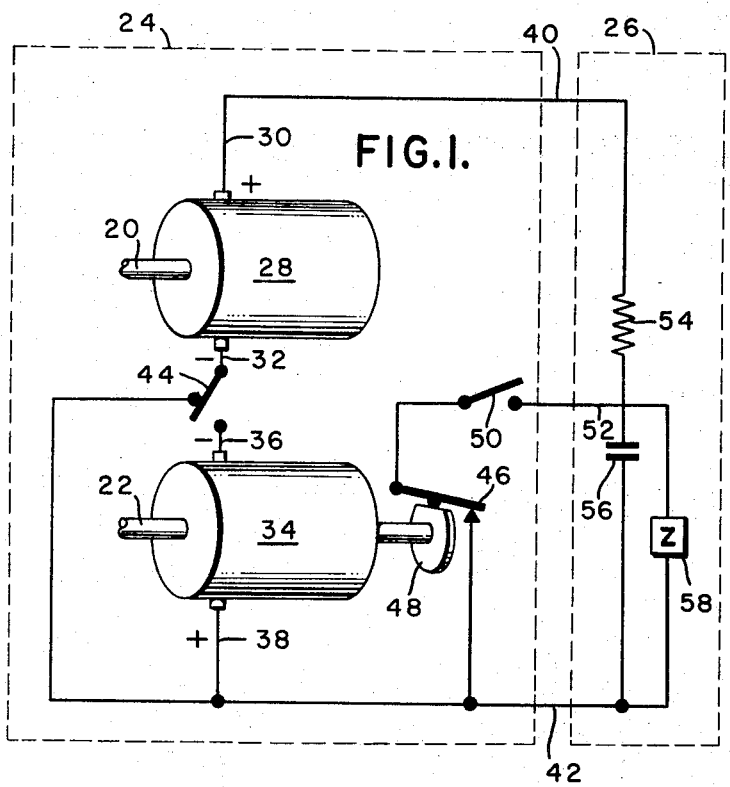
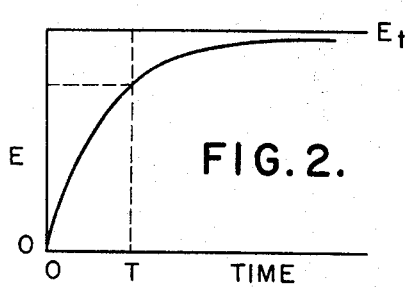
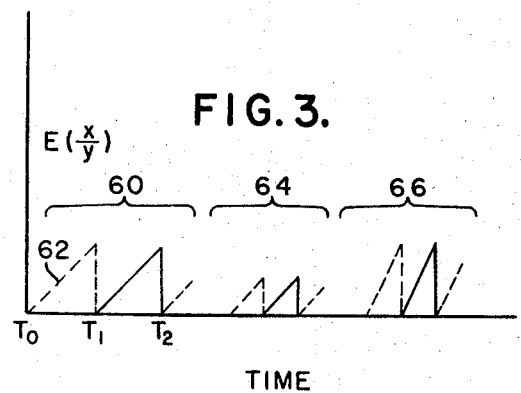
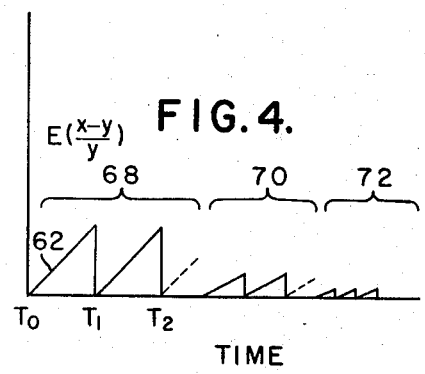
INVENTORS
JOHN M. GREEN
RONALD HORNE
BY Kelly D. Corley
ATTORNEY

United States Patent Office 3,343,086
Patented Sept. 19, 1967

3,343,086
CAPACITIVE SIGNAL COMPARISON CIRCUIT
John M. Green and Ronald Horne, Pensacola, Fla., assignors to Monsanto Company, a corporation of Delaware
Filed Mar. 20, 1963, Ser. No. 266,544
4 Claims. (Cl. 324—111)

The present invention concerns an apparatus adapted for continuously measuring and analyzing relationships between quantities. More particularly, the invention concerns such apparatus wherein electrical signals are combined in such a manner as to control the charge on a capacitor, whereby the charge is proportional to the desired relationship.

There are many applications for apparatus which is capable of determining the ratio between a given quantity and a second quantity, and determining the difference between two quantities as a percentage of one of the quantities. Existing approaches to the solution to this problem are typically cumbersome and complex, usually involving elaborate and expensive circuitry.

Accordingly, a primary object of the invention is to provide apparatus for determining the ratio of a given quantity to a second quantity.

A further object is to provide apparatus for determining the difference between two quantities as a percentage of one of the quantities.

A further object is to provide apparatus for accomplishing the above objects in a simple, economical, and reliable manner.

Other objects of the invention will in part be obvious and will in part appear hereinafter.

The invention accordingly comprises the features of construction combination of elements, and arrangement of parts which will be exemplified in the construction hereinafter set forth, and the scope of the invention will be indicated in the claims.

For a more complete understanding of the nature and objects of the invention, reference should be made to the following detailed description taken in connection with the accompanying drawing, in which:

FIGURE 1 is a schematic circuit diagram illustrating the basic principles of the invention, FIGURE 2 is a diagram illustrating the voltage in a series RC network as a function of time, FIGURE 3 is a graph of voltage against time, used to explain one mode of operation of the FIGURE 1 circuit, and FIGURE 4 is a graph of voltage against time, used in explaining another mode of operation of the circuit of FIGURE 1.

Referring now generally to FIGURE 1, there is schematically shown an exemplary system for analyzing a first signal in the form of a DC voltage, and a second signal in the form of a switching action of variable rate. The first and second signals are provided by a signal section 24 and are then selectively applied to the analyzing circuit 26, depending upon the function or relationship to be determined, as will be more fully explained.

For illustrative purposes these first and second signals are here disclosed as derived from mechanical motions, i.e., the angular velocity of a pair of rotating shafts 20 and 22. It should be understood that electrical signals of the appropriate character from any source may be analyzed without necessarily involving electromechanical transducers.

Thus shaft 20 drives a direct current generator 28 which produces a DC signal voltage output on its terminals 30 and 32 which is directly proportional to the angular velocity of shaft 20. An identical generator 34 is driven by shaft 22, and produces a DC signal voltage on terminals 36 and 38. Generators 28 and 34 may be poled so that the polarity produced on terminals 32 and 36 is the same, as indicated on the drawing. A pair of signal conductors 40 and 42 extend from signal section 24 to analyzing circuit 26, and constitute a signal input for the first $E_t$ to the signal section 24. In the exemplary embodiment shown in FIGURE 1, terminal 30 of generator 28 is directly connected to conductor 40, while terminal 38 of generator 34 is directly connected to conductor 42. A single-pole double-throw switch 44 permits the application to conductors 40 and 42 of either the output of generator 28 alone or the resultant output of generators 28 and 34 connected in series. Since generators 28 and 34 are oppositely poled, as above noted, the resultant output $E_t$ corresponds to the difference between the angular velocities of shafts 20 and 22.

A pair of breaker points 46 are actuated periodically at a repetition rate proportional to the angular velocity of shaft 22, for example by a suitable cam assembly 48. One of breaker points 46 is connected to input conductor 42, while the other breaker point is connected through a switch 50 to a terminal 52 in analyzing circuit 26. This provides for a signal of the second type to circuit 26, as will be explained below.

Analyzing circuit 26 comprises in its simplest form a time-constant circuit including a resistor 54 and a capacitor 56 connected in series between input conductors 40 and 42. A suitable load device 58, for example a voltmeter, is connected across capacitor 56 to respond to the average voltage developed thereacross. As illustrated, terminal 52 is connected to the junction of resistor 54 and capacitor 56.

The direct current signal voltage $E_t$ on conductors 40 and 42 is applied as an input signal to the analyzing circuit 26, and produces an output signal across the terminals of capacitor 56. Depending on the position of switch 44 the input signal $E_t$ thus applied to analyzing circuit 26 will be either the output of generator 28 alone, and thus be proportional to a first quantity X (as illustrated, the angular velocity of shaft 20), or, since the generators are oppositely poled, when terminals 32 and 36 are connected by switch 44, the signal on conductors 40 and 42 is a composite signal proportional to the first quantity X minus the second quantity Y (the difference between the angular velocity of shaft 20 and the angular velocity of shaft 22). It will be understood that either or both of the quantities X and Y may be composite if desired, i.e., either X or Y may be the sum, difference, or other function of a plurality of quantities.

FIGURE 2 shows the charging curve of capacitor 56, with the capacitance C, charged through series resistor 54 having resistance R by voltage $E_t$, and shows the voltage across the capacitor after the lapse of any given time T after the voltage $E_t$ is applied. As is well known in the art, the curve follows the equation $$E = E_t\left(1 - e\left(-\frac{T}{RC}\right)\right)$$

By convention the time constant of a series RC circuit is defined as the number of seconds required for the voltage E across the capacitor to reach 63.2% of the applied voltage $E_t$, and is numerically equal to the product RC. Note that the curve in FIGURE 2 is reasonably linear when T is near 0, the slope in this region is directly proportional to $E_t$, and that the voltage E is substantially proportional to T in this region. This property is used to permit division of the input signal $E_t$ by another quantity.

Referring again to FIGURE 1, closing switch 50 permits the signal appearing across capacitor 56 to be discharged each time points 46 are closed. Since points 46 are actuated by cam 48, which in turn is driven by shaft 22, points 46 will be closed at a repetition rate directly proportional to the angular velocity of shaft 22. The lengths of the intervals between closing of points 46 (the charging times of capacitor 56) are thus inversely proportional to the angular velocity of shaft 22. If the time constant of analyzing circuit 26 is high compared to the length of intervals between closing of points 46 so that the voltage developed across capacitor 56 before discharging is a linear function of time, the average or peak voltages across capacitor 56 will be inversely proportional to the repetition rate at which points 46 are closed. Thus the capacitor discharging mechanism provides for dividing the input signal $E_t$ by the second quantity Y.

There will be considered first the situation wherein it is desired to divide the signal $E_t$ corresponding to a first quantity X by an independent signal corresponding to quantity Y. Referring to FIGURE 1, switch 44 is placed in the position illustrated, connecting generator 28 to input conductors 40 and 42. Switch 50 is closed, enabling contacts 46 to periodically discharge capacitor 56.

Referring now to FIGURE 3, there are illustrated typical wave form diagrams of the sawtooth voltage E produced across capacitor 56 as functions of time for different values of the first and second signals when the signals are independent. Section 60 shows a particular condition with line 62 indicating the voltage E across capacitor 56 at any given time T. The slope of line 62 with respect to the time axis between $T_0$ and $T_1$ is determined by $E_t$, the first input signal, and as illustrated the voltage represented by line 62 periodically returns to zero as contacts 46 close, indicated at $T_1$ and $T_2$. Line 62 thus defines with the time axis a series of right triangles having altitudes equal to the peak voltage E and bases equal to the intervals between actuations of contacts 46. The effect of varying the repetition rate at which contacts 46 close may be seen by comparing section 60 with section 64, wherein $E_t$ is unchanged and the repetition rate is twice that shown in section 60. It is particularly noted that the slope of line 62 in the intervals between closing of contacts 46 is unchanged since $E_t$ is unchanged. The triangles in section 64 are thus congruent to those in section 60, and since their bases are half as long as those in section 60, their altitudes are half as high as those in section 60. Thus, so long as $E_t$ remains unchanged and the duration of charging of capacitor 56 between successive discharges by contacts 46 is a minor portion of the time constant of resistor 54 and capacitor 56, the maximum voltage across capacitor 56 is inversely proportional to the repetition rate at which capacitor 56 is discharged.

The effect of changing of the signal $E_t$ may be seen by comparing section 64 with section 66 in FIGURE 3. Section 66 shows the condition in which the voltage $E_t$ is twice the voltage $E_t$ in section 64, while the repetition rate of closing of contacts 46 remains unchanged from that in section 64. It is particularly noted that the slope of line 62 during the charging intervals (the slope of the leading edge of the saw-tooth voltage) is directly proportional to voltage $E_t$ and is thus steeper in section 66 than in section 64. Since the signal $E_t$ has been doubled, the voltage E appearing on capacitor 56 will be twice that indicated in section 64 after any given interval of time, and the peak voltage appearing on capacitor 56 is twice that depicted in section 64.

The relationship $$\frac{X-Y}{Y}$$

may be determined by actuating switch 44 so that generator terminals 32 and 36 are connected. Signal $E_t$ now corresponds to $X-Y$, and since the repetition rate of contacts 46 is proportional to Y, the signal output across capacitor 56 will correspond to $$\frac{X-Y}{Y}$$

Typical comparative waveforms of the voltage across capacitor 56 are shown in FIGURE 4, for three different values of X and Y. Section 68 serves as a reference to define the scale of the ordinate and abscissa shown on the graph and depicts the waveform when quantity X has a value of 4 and Y has the value 1. Sections 70 and 72 are drawn to the same scale as section 68, and represent situations wherein $X=4$, $Y=2$, and $X=4$, $Y=3$. The slope of line 62 during the charging intervals depends upon $E_t$, and the length of the charging interval depends upon the repetition rate at which contacts 46 close, as before.

The above description and the accompanying drawing have been simplified for the sake of clarity in disclosing the present invention. It will be obvious from the above disclosure that suitable switching mechanisms may be added, together with other signal sources, to provide comparisons between as many signal sources as desired. Likewise, the switching signal disclosed as performed by contacts 46 may be performed by any suitable switching arrangement, driven from any desired source. For example, contacts 46 may be driven from a suitable cam arrangement located on shaft 20, if desired, or other types of switches may be used than the electromechanical type illustrated.

The above specification taken in connection with the accompanying drawing has disclosed a signal analyzing system of broad utility in a variety of environments, which is particularly adapted for determining ratios, either between independent or related quantities. The invention utilizes simple, economical and reliable components to accomplish these objects since the analyzing circuit itself consists basically of a series time constant circuit, supplied by a first D.C. signal and a switching signal.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Circuitry, comprising in combination:
   a. first and second direct current signal sources connected in series opposition to a pair of output terminals,
   b. a resistor and capacitor connected in series across said output terminals,
   c. output means responsive to the voltage developed across said capacitor, and
   d. means for periodically discharging said capacitor at a repetition rate proportional to the signal output of one of said signal sources.

2. The combination defined in claim 1 wherein the time constant of said resistor and capacitor is at least 10 times the repetition rate of said discharging means.

3. The combination defined in claim 1 wherein said discharging means comprises electrical switch means connected across said capacitor and driven from said second source.

4. Circuitry, comprising in combination:
   a. first and second direct current generators connected in series opposition to a pair of output terminals,
   b. a resistance and a capacitance connected in series across said output terminals,
   c. output means responsive to the voltage developed across said capacitor, and
   d. a discharge mechanism for periodically discharging said capacitor at a repetition rate proportional to the output signal of one of said generators.

References Cited

UNITED STATES PATENTS

| | | | |
|---|---|---|---|
| 2,397,540 | 4/1946 | Dome | 324—120 |
| 2,511,868 | 6/1950 | Newsom | 324—111 X |
| 2,880,935 | 4/1959 | Johnson | 235—194 |
| 3,024,999 | 3/1962 | Heacock | 235—196 |

RUDOLPH V. ROLINEC, *Primary Examiner.*

WALTER L. CARLSON, *Examiner.*

G. L. LETT, E. F. KARLSEN, *Assistant Examiners.*